(12) United States Patent
Narayan et al.

(10) Patent No.: US 11,373,535 B2
(45) Date of Patent: Jun. 28, 2022

(54) METHOD AND SYSTEM FOR SCHEDULING A DRIVER SERVICE PROVIDER FOR ONE OR MORE THIRD PARTIES

(71) Applicant: ZUM SERVICES, INC., Redwood City, CA (US)

(72) Inventors: Ritu Narayan, San Carlos, CA (US); Vivek Garg, San Mateo, CA (US); Abhishek Garg, Cambridge, MA (US)

(73) Assignee: Zum Services, Inc., Redwood City, CA (US)

( * ) Notice: Subject to any disclaimer, the term of this patent is extended or adjusted under 35 U.S.C. 154(b) by 0 days.

(21) Appl. No.: 16/715,203

(22) Filed: Dec. 16, 2019

(65) Prior Publication Data

US 2020/0193836 A1 Jun. 18, 2020

Related U.S. Application Data

(63) Continuation of application No. 16/035,223, filed on Jul. 13, 2018, now Pat. No. 10,510,259.

(51) Int. Cl.
*G08G 1/123* (2006.01)
*G08G 1/00* (2006.01)
*G01C 21/34* (2006.01)
*G08G 1/052* (2006.01)

(52) U.S. Cl.
CPC ......... *G08G 1/205* (2013.01); *G01C 21/3438* (2013.01); *G08G 1/052* (2013.01); *G08G 1/202* (2013.01)

(58) Field of Classification Search
CPC ........ G08G 1/205; G08G 1/052; G08G 1/202; G01C 21/3438

USPC ............ 340/993, 994, 995, 17; 701/5, 7, 12
See application file for complete search history.

(56) References Cited

U.S. PATENT DOCUMENTS

| | | | |
|---|---|---|---|
| 10,055,996 B2 | 8/2018 | Narayan et al. | |
| 10,264,389 B1* | 4/2019 | Hwang | H04W 4/02 |
| 10,510,259 B2 | 12/2019 | Narayan et al. | |
| 2006/0059023 A1 | 3/2006 | Mashinsky | |
| 2011/0099040 A1 | 4/2011 | Felt | |
| 2016/0117610 A1 | 4/2016 | Ikeda | |
| 2016/0356615 A1* | 12/2016 | Arata | G01C 21/3438 |
| 2017/0127215 A1* | 5/2017 | Khan | H04W 4/021 |
| 2017/0147155 A1 | 5/2017 | Krishnamoorthy | |
| 2017/0191841 A1* | 7/2017 | Marueli | G01C 21/20 |
| 2018/0107949 A1 | 4/2018 | Zhao | |
| 2018/0137593 A1 | 5/2018 | Djuric | |
| 2018/0202822 A1* | 7/2018 | DeLizio | G06Q 30/0645 |
| 2019/0311629 A1* | 10/2019 | Sierra | G06Q 10/02 |
| 2020/0005414 A1* | 1/2020 | Matsumoto | G06Q 20/322 |
| 2020/0160709 A1* | 5/2020 | Ramot | B60W 60/00253 |

* cited by examiner

*Primary Examiner* — Tai T Nguyen
(74) *Attorney, Agent, or Firm* — Loyal IP Law, PLLC; Travis Banta

(57) ABSTRACT

This disclosure generally relates to a method and system for providing a ride for a third party rider at the request of a user ride requestor. In one embodiment, a driver device may be used to receive a ride request from one or more server computing devices for a third party rider. The driver device may receive information identifying the third party rider, including a password. Further, the driver device may transmit real time ride status information to the ride requestor directly or indirectly via the one or more server computing devices.

20 Claims, 9 Drawing Sheets

METHOD AND SYSTEM FOR SCHEDULING A DRIVER SERVICE PROVIDER FOR ONE OR MORE THIRD PARTIES

PRIORITY CLAIM

This application is a continuation of and claims priority to U.S. patent application Ser. No. 16/035,223, filed on Jul. 13, 2018, which is a continuation of and claims priority to U.S. patent application Ser. No. 15/411,851, filed on Jan. 20, 2017 (now U.S. Pat. No. 10,055,996, issued on Aug. 21, 2018), which is herein incorporated by reference in its entirety.

BACKGROUND

1. Technical Field

This disclosure relates generally to a method and system for scheduling a driver service provider to provide a ride service for one or more third parties. More specifically, the system disclosed herein determines an optimal driver from a set of trusted drivers, and in response to receiving a service request from a user, assigns a willing optimal driver to provide a driving service for a third party. Further disclosed is a method for scheduling a driver service provider to provide a ride service for a third party rider based on identification information of the third party transmitted to the driver service provider.

2. Description of the Related Art

As the public becomes more conscious of environmental concerns, and experiences the financial strain of commuting, there is an increasing demand for better solutions for transportation. In response, car pools allow many people to ride together in one vehicle from one general area to another general area (i.e., from a residential district of a city where each rider lives to a downtown district of a city where each rider works). Many cities have mass transportation systems, including streetcars, trains, light rail, buses, cabs, and other mass transport.

Each of these solutions has positives and negatives that make at least some potential users uncomfortable or with their needs unmet. More recently, ride sharing technology has been developed, which allows a user to request a ride for one or more people from one place to another. The user may transmit a request to one or more server computing devices associated with a number of drivers who are willing to provide a ride service for the one or more people. For example, but not meant as limiting, the user may transmit a request for a ride service to transport him/her and his/her roommate home from a party. In response, a driver associated with the ride service transports the user and the user's roommate home from a party. The user pays a fee to the driver associated with the ride service for the ride service.

Ride sharing is ubiquitous in many large cities in the United States. One limitation of conventional ride sharing technology is that ride sharing relies on the judgment and experience of the user to determine whether or not a particular driver is trustworthy enough to safely transport the user from one place to another. Thus, potential users who lack judgment and experience, or in other words, suffer from diminished mental or physical capacity and who cannot properly identify a safe driver, are at risk when they are offered a ride in a conventional ride sharing situation. For example, but not meant as limiting, say a young child needs a ride to a piano lesson while the child's parents are working. In a conventional ride share program, the young child must rely on his or her less informed judgment and experience to identify whether or not his or her parents would approve of a driver who purports to be the child's driver. In this scenario, parents would worry immeasurably at the thought of their child getting into a vehicle with a driver unknown to them.

Other people with diminished judgment may be similarly at risk. For example, some elderly people with memory weakness or dementia, disabled individuals with reduced communication or cognitive ability, young children, sick people, intoxicated people, people under the influence of narcotics or other drugs, and others may not be able to discern and distinguish a safe driver from an unsafe driver. Further, many of these same individuals lack either the capacity or the ability to request a ride service.

Accordingly, it is one object of this disclosure to provide a system in which a driver may be scheduled to provide a ride service at the request of a non-riding party for a third party rider. It is another object of this disclosure to provide a system whereby the driver may be scheduled to provide a ride service by a requesting user for a third party who is experiencing reduced mental capacity or lacks the experience and judgment to identify a safe driver and a safe ride service environment. It is another object of this disclosure to provide a system, which may notify both a driver and a third party of a ride service request requested by the ride requestor. Finally, it is a further object of this disclosure to provide a method allowing a user to request a driver to provide a ride service for one or more third party riders where the driver is selected from a trusted pool of drivers.

SUMMARY

Disclosed herein is a method of providing a ride service for a third party in response to a ride request from a user ride requestor. The method comprises receiving, by a driver device, a ride request for a third party rider. The method further comprises receiving, by a driver device, identification information for the third party rider where the identification information includes a password. The method further comprises transmitting, by a driver device, real time ride status information to the user ride requestor.

Further disclosed herein is a system for providing a ride service for a third party in response to a ride request from a user ride requestor. The system may include a driver device including a processor to receive a ride request for a third party rider. The processor included in the driver device may further receive identification information for the third party rider that includes a password. The processor included in the driver device may also transmit real time ride status information to the user ride requestor.

Also disclosed is a non-transitory computer-readable medium containing instructions which, when executed by a processor, cause the processor to receive a ride request made by a user ride requestor for a third party rider. The processor is further caused to receive identification information for the third party rider, the identification information including a password. The processor may be further caused to transmit real time ride status information to the user ride requestor.

BRIEF DESCRIPTION OF THE DRAWINGS

The accompanying drawings illustrate various embodiments of the method and system for scheduling a ride service for one or more third parties.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

In general, this disclosure relates to a driver's interaction with a system that is intended to allow a user ride requestor to schedule a ride for a third party. It is noted the user ride requestor is the ride requestor, but not necessarily a ride service recipient. In one embodiment, a user ride requestor may be a parent scheduling a ride for a child. Thus, the ride requestor may be considered to be the parent while the third party rider is a child. In this way, the parent may schedule a ride provided by a driver for a child during which the safety of the child may be protected. In a preferred embodiment, the third party may be riding alone or with another third party and without the ride requestor. It is also noted that any vulnerable person may be considered a third party rider and may benefit from a ride scheduled using method and systems disclosed herein. Vulnerable persons may include anyone with a reduced mental capacity or whose judgment or life experience is less than what a reasonable person may require to adequately assess the safety of a particular situation, such as getting in a car with an unknown driver. Examples of vulnerable persons include some elderly people with memory weakness or dementia, disabled individuals with reduced communication or cognitive ability, young children, sick people, intoxicated people, people under the influence of narcotics or other drugs, and others who may not be able to distinguish a safe driver from an unsafe driver.

Figure 1:
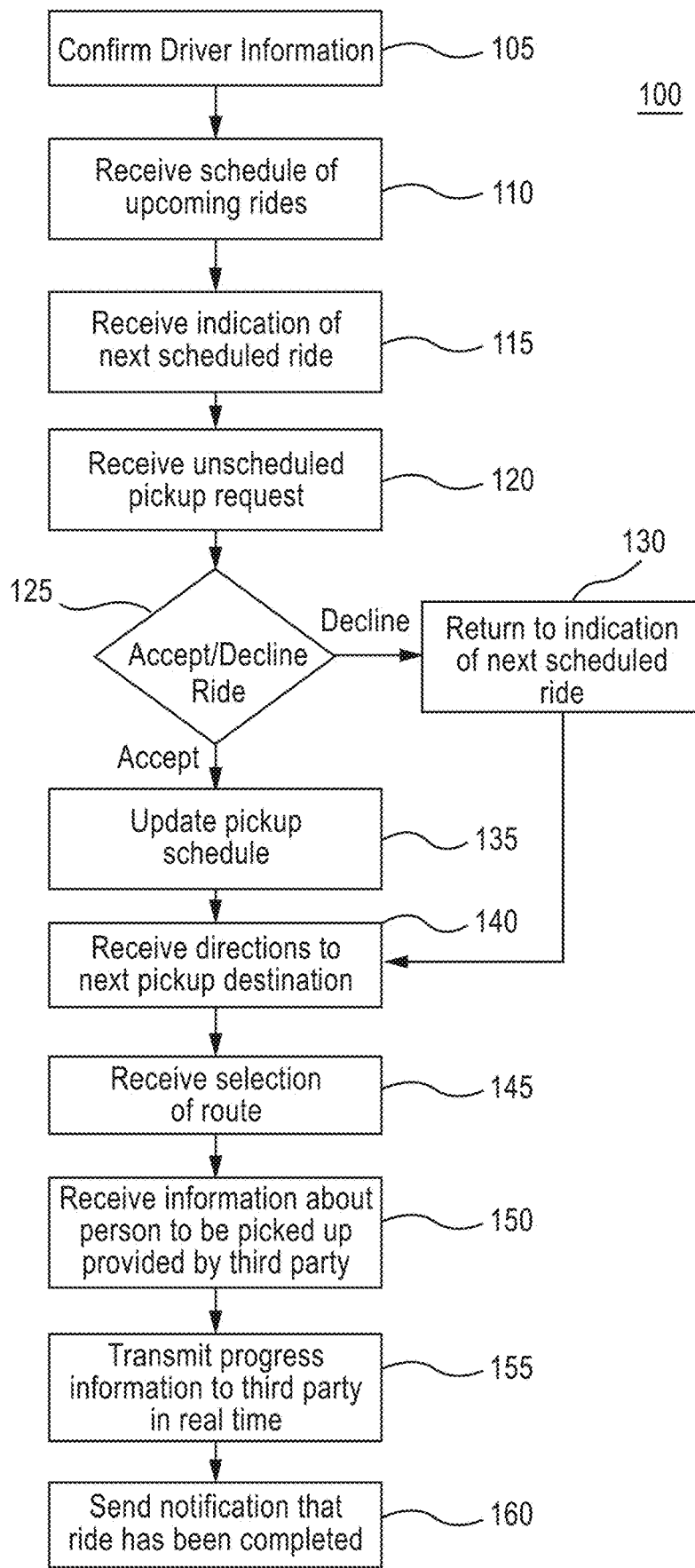
FIG. 1 illustrates flowchart for a method of scheduling a driver to provide a ride service for one or more third party riders where the driver is selected driver from a trusted pool of drivers.

FIG. 1 illustrates an exemplary method 100 of scheduling a driver to provide a ride service for one or more third party riders where the driver is selected driver from a trusted pool of drivers. The method is executed by a system to allow a user ride requestor to schedule a driver to provide a ride service for a third party, especially a vulnerable third party. A driver may install a program, which executes method 100 on a driver device. The driver device (and the user ride requestor which will be discussed later) may be a computing device. Examples of computing devices include desktop computers, laptop computers, tablets, game consoles, personal computers, notebook computers, and any other electrical computing device with access to processing power sufficient to interact in a timely manner with a one or more server computing devices computer. The user device associated with the user ride requestor may include software and hardware modules, sequences of instructions, routines, data structures, display interfaces, and other types of structures that execute computer operations. Further, hardware components may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. These hardware components within the user device associated with the user ride requestor may be used to execute the various applications, methods, or algorithms disclosed herein independent of other devices disclosed herein.

Method 100 may begin by confirming driver information at step 105. Driver information may include information about both the driver and the driver's vehicle. For example, the driver may confirm the driver's name, the driver's driver license number and expiration date. The driver may further confirm the make, model, year, color, and license plate number for the driver's vehicle. This information may be used to identify both the driver and the driver's vehicle for a third party rider, as will be discussed below.

In response to the driver confirming driver information at step 105, a driver device may receive a schedule of upcoming scheduled rides at step 110. The schedule of upcoming rides may provide the driver with information about who will be riding, time to pickup time, time distance to the pickup location, contact information for either the third party rider or the ride requestor, directions, and may list each pickup and dropoff scheduled for a particular driving shift.

In response to selecting a next ride from the list of upcoming rides, the driver may be provided, by a display on the driver device, with additional information about the next ride on the schedule at step 115. The additional information may include a map, information about who will be riding, time to pickup time, time distance to the pickup location, contact information for either the third party rider or the ride requestor, directions, and may include a map indicator showing the vehicle's current location.

At step 120, the driver may be presented with an unscheduled pickup request. It should be noted that an unscheduled ride request may occur at any point in method 100 but is explained for exemplary purposes as occurring before the driver has picked up a first rider. The new pickup request received by the driver may include information about other trusted drivers in the area, a map of the location of the pickup request, pickup location information, dropoff location information, third party rider information, and may allow the driver to decline or accept the ride request.

At this point, the driver may, at step 125, choose to accept or decline the ride request based on the driver's preferences, the amount of time the driver has before the next scheduled pickup, or any other criteria chosen by the driver. Should the driver choose to accept the unscheduled ride request (step 125—Accept), the driver device will update the pickup schedule at step 135 accordingly. At step 140, the driver device may receive directions to the new next pickup location.

However, should the driver choose to decline the unscheduled ride request (step 125—Decline), the driver device may return to the indication of the next scheduled ride provided at step 115 in step 130. The driver device may further be updated to receive and provide directions to the next scheduled pickup destination at step 140.

Once the driver receives directions to the next pickup destination at step 140, the driver may select a route at step 145 that the driver desires to take to the pickup destination. The driver device may provide information about a total trip distance, an estimated time of arrival to the pickup location, an option to contact the third party or the ride requestor, and an option to begin the directions to the pickup destination.

Once the driver device determines that the driver arrived at the pickup location at step 150, the driver device may receive and provide the driver with information about the third party rider. For example, the driver may receive information identifying the third party rider, the third party rider's interests, trip information, and password information. Password information may be a password set by the user ride requestor and communicated to the driver and the third party rider. The third party rider may request the password from the driver to ensure that the driver is indeed the driver the ride requestor intended to dispatch to provide the third party rider a ride. The driver device may also include an option to contact the third party or the ride requestor and an option to start the trip.

At step 155, the driver device may transmit real time location data to the user device associated with the user ride requestor or to one or more one or more server computing devices computing devices associated with the ride service system. The real time location data may be transmitted directly to the user device associated with the user ride requestor or may be transmitted indirectly to the user device associated with the ride requestor via one or more one or more server computing devices computing devices. The one or more one or more server computing devices computing devices may include cloud computers, super computers, mainframe computers, application server computing devices, catalog server computing devices, communications server computing devices, computing server computing devices, database server computing devices, file server computing devices, game server computing devices, home server computing devices, proxy server computing devices, standalone server computing devices, web server computing devices, combinations of one or more of the foregoing examples, and any other computing device that may be used to execute all or some of method 100. The one or more one or more server computing devices computing devices may include software and hardware modules, sequences of instructions, routines, data structures, display interfaces, and other types of structures that execute one or more server computing devices computer operations. Further, hardware components may include a combination of Central Processing Units ("CPUs"), buses, volatile and non-volatile memory devices, storage units, non-transitory computer-readable media, data processors, processing devices, control devices, transmitters, receivers, antennas, transceivers, input devices, output devices, network interface devices, and other types of components that are apparent to those skilled in the art. These hardware components within one or more one or more server computing devices computing devices may be used to execute the various methods or algorithms disclosed herein and interface with the user device associated with the user ride requestor.

The real time location data provided to the one or more server computing devices by the driver device may include information such as location of the vehicle on a map, the speed of the vehicle, the distance the vehicle travels, the distance the vehicle has yet to travel, and the estimated time of arrival. The driver device may further include options for the driver to contact the ride requestor, or to provide a further ride update.

Once the driver device detects the vehicle arrived at the destination location for the third party rider's ride at step 160, the driver device may receive or provide the driver with additional information about the dropoff conditions. The additional information may include a contact party to whom custody of the third party rider should be entrusted, a description of the contact party, an average speed of the ride, a distance covered by the ride, and a status indicator showing that the destination has been reached. The display device may provide the driver with an option to notify the ride requestor, the third party rider, and the one or more server computing devices the ride is completed and the third party rider safely arrived to the custody of the contact party. The display device may also contain an option for the driver to call the ride requestor if additional information or concerns arise during the dropoff of the third party rider.

Figure 2:
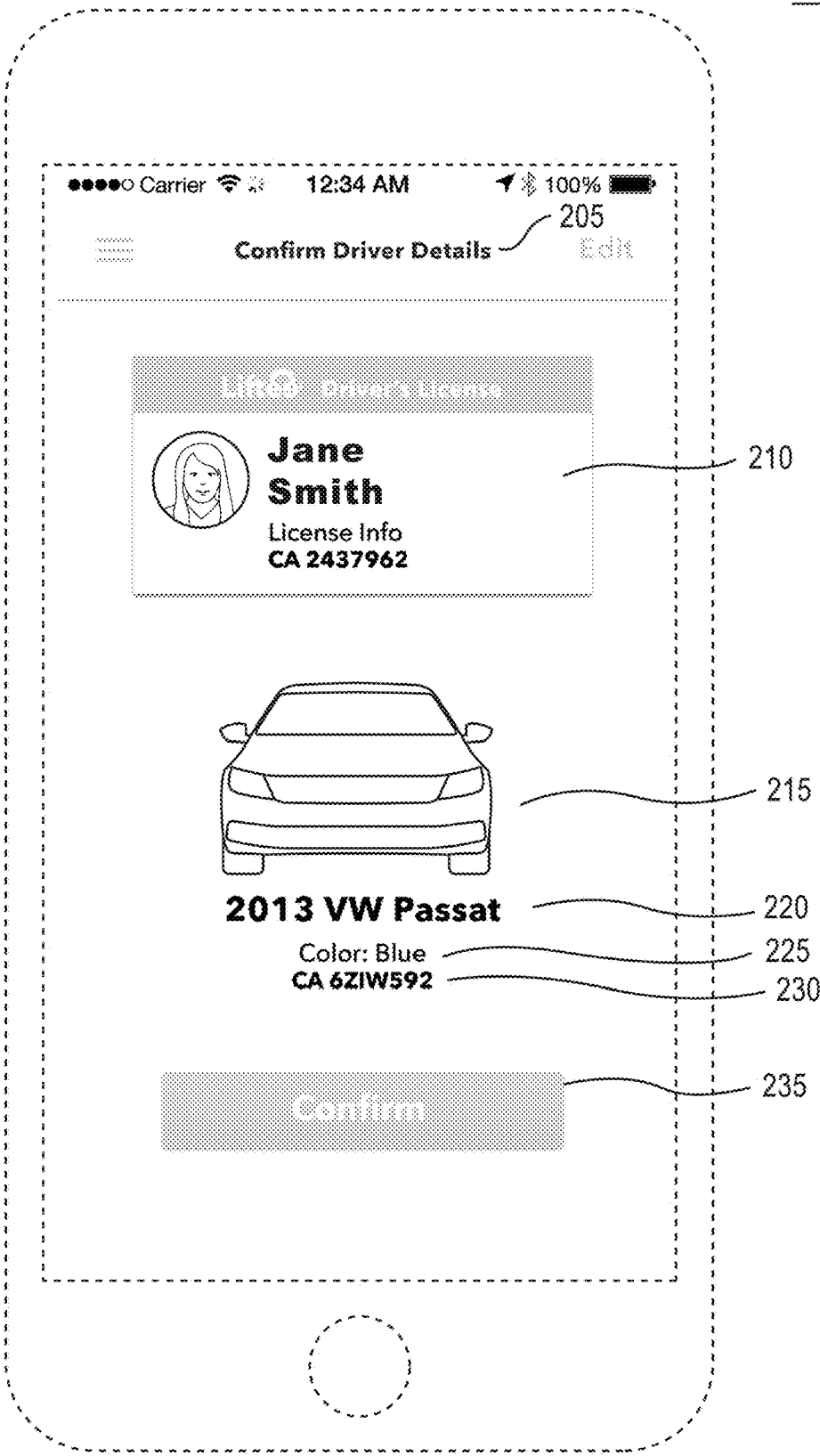
FIG. 2 illustrates a graphical user interface allowing a driver to provide driver information.

FIG. 2 illustrates a graphical user interface 200 allowing a driver to provide driver information. Graphical user interface 200 includes indicator 205 indicating that graphical user interface 200 is soliciting confirmation of correct driver information 210 for the driver. Driver information 210 may include the name of the driver, a picture of the driver, the issuing authority for the driver's driver license (e.g., state, country, province, etc.), and the driver's driver license number. Graphical user interface 200 may also include vehicle information. Vehicle information may include a picture or a virtual representation 215 of the driver's vehicle; year, make, and model information 220; vehicle color information 225; and vehicle license plate information 230. In graphical user interface 200, year, make, and model information 220 identifies the driver's vehicle as a 2013 model year Volkswagen Passat. Vehicle color information 225 identifies the driver's vehicle as being blue in color while the vehicle license plate information 230 identifies the license plate number as being a California issued license plate with the number 6ZIW592.

It is also noted that a picture or virtual representation 215 of the driver's vehicle may also provide a visual representation of vehicle color information 225 by showing the vehicle in graphical user interface 200 as being a blue colored vehicle. Picture or virtual representation 215 of the driver's vehicle may also be shown in graphical user interface 200 with a license plate having the correct vehicle license plate information 230. Once the driver confirms the information shown in graphical user interface 200 is accurate, the driver may indicate the information was confirmed by interacting with interactive element 235.

Figure 3:
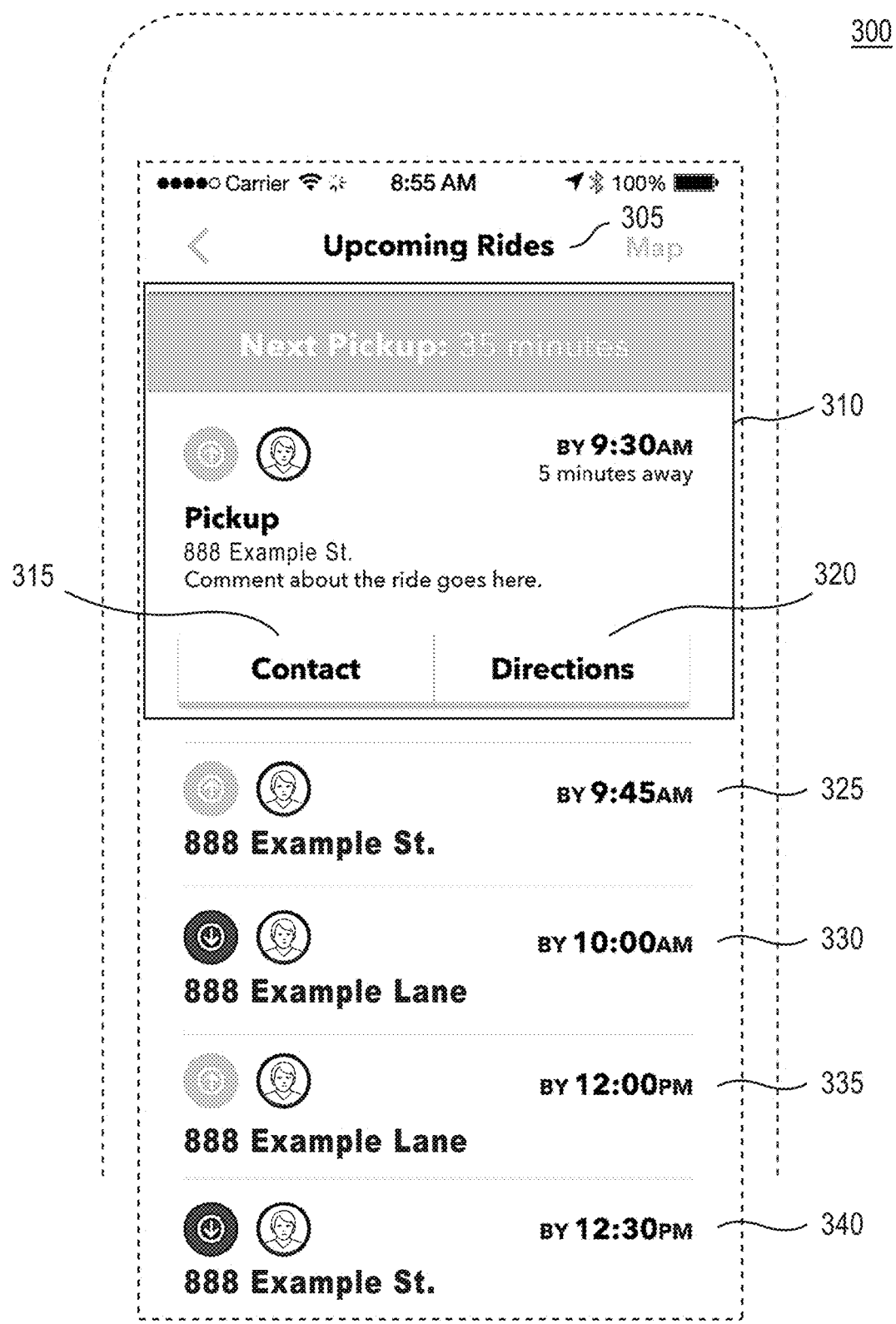
FIG. 3 illustrates a graphical user interface providing a driver with a schedule of upcoming ride services.

FIG. 3 illustrates a graphical user interface 300 which provides a driver with a schedule of upcoming ride services. Graphical user interface 300 includes an indicator 305 indicating that graphical user interface 300 is displaying a list of upcoming rides to be provided by the driver. Graphical user interface 300 further includes an information box 310 providing information about the driver's next pickup. For example, information box 310 may show the amount of time before the driver's next pickup, a picture or virtual representation of the third party rider, a pickup time, a distance in time to the next pickup location, an address of the pickup, user ride requestor comments provided for the driver by the ride requestor, and other relevant information to the ride. Information box 310 may also provide interactive elements such as interactive element 315 and interactive element 320. Interactive element 315 may allow a driver to contact the third party rider or the user ride requestor by text message or telephone call. Interactive element 320 may provide a driver with directions to the pickup location.

Graphical user interface 300 lists a number of pickup and dropoff events for the driver for a particular period of time (a day, a shift, etc.). The list of pickup and dropoff events includes a pickup event 325, a dropoff event 330, a pickup event 335, and a dropoff event 340. Each of pickup and dropoff events 325-340 in the list may include information including an indicator as to whether or not the event is a pickup or a drop off, a picture or a visual representation of the third party rider, an address for the pickup or dropoff, and a time for the pickup or dropoff event to be performed. In response to the driver selecting information box 310, the driver may be provided with graphical user interface 400 shown in FIG. 4.

Figure 4:
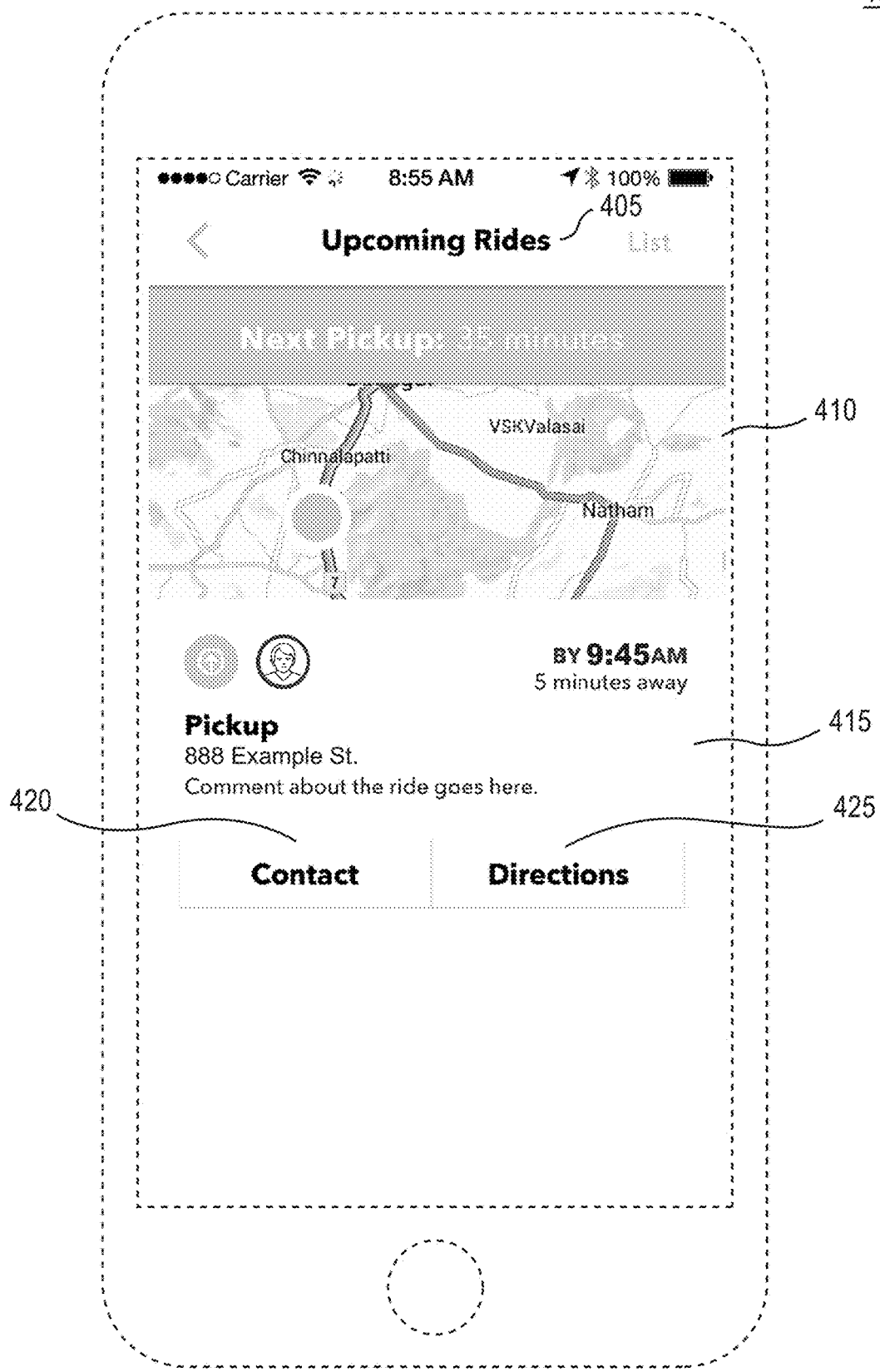
FIG. 4 illustrates a graphical user interface providing a driver with information related to upcoming rides.

FIG. 4 illustrates a graphical user interface 400, which provides a driver with information related to upcoming rides, as shown by indicator 405. Graphical user interface 400 may further include an information box 410, which provides information about the next ride, including information about the amount of time before the next third party rider pickup is to occur, a map that includes an indicator showing the current location of the driver's vehicle, an indicator showing that the ride is a pickup, a picture or visual representation of the third party rider, a time by which the third party rider is to be picked up, and a distance in time to the third party rider's pickup location.

Graphical user interface 400 may further include pickup information 415, which includes an address for the pickup and comments provided by the user ride requestor. Graphical user interface 400 further provides interactive elements such as interactive element 420 and interactive element 425. Interactive element 420 may allow a driver to contact the third party rider or the user ride requestor by text message or telephone call. Interactive element 425 may provide a driver with directions to the pickup location.

Figure 5:
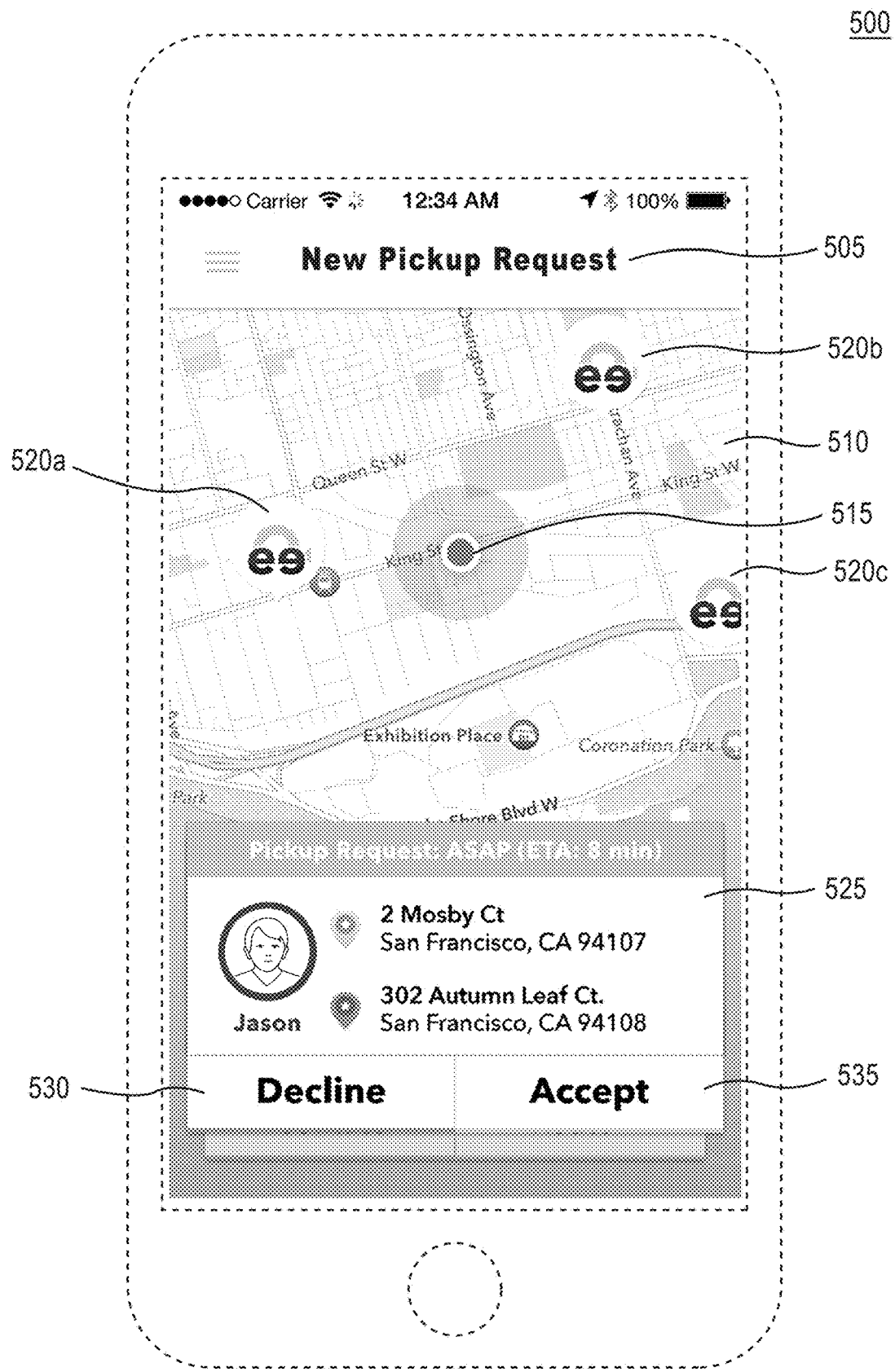
FIG. 5 illustrates a graphical user interface showing an unscheduled new pickup request for a driver.

FIG. 5 illustrates a graphical user interface 500 showing an unscheduled new pickup request for a driver. As previously mentioned, a new pickup request can occur at any time providing the driver with an opportunity to accept or decline the new pickup request. When an unscheduled pickup request occurs, a driver may be notified by graphical user interface 500, which includes an indicator 505 indicating that a new pickup request has been created by a user ride requestor. Graphical user interface 500 may further include a map 510 which includes an indicator 515 indicating a pickup location for the new pickup request. Map 510 may further include indicators 520*a*, 520*b*, and 520*c* showing other trusted drivers in the area who may be willing to accept the new pickup request. The driver may also be identified on the map as one of indicators 520*a*, 520*b*, and 520*c*.

Graphical user interface 500 may further include an information box 525 providing additional information about the new pickup request. The additional information may include a time for the pickup (or ASAP—as soon as possible), an estimated time of arrival for the driver, a pickup address for the new pickup request, a dropoff address for the new pickup request, map identifiers (not shown on map 510 in FIG. 5) representing the pickup location and the dropoff location for the new pickup request, a picture or visual representation of the third party rider, an estimated duration for the ride, a name of the third party rider, and other pertinent information. Graphical user interface 500 further provides interactive elements such as interactive element 530 and interactive element 535. Interactive element 530 may allow a driver to decline the new pickup request based on the provided information. Interactive element 535 may allow a driver to accept the new pickup request.

Should the driver accept the new pickup request, the driver's schedule, shown in graphical user interface 300 of FIG. 3, may be updated to reflect the acceptance of the new pickup request and the driver's schedule may be further updated to reflect the new pickup in the schedule.

Figure 6:
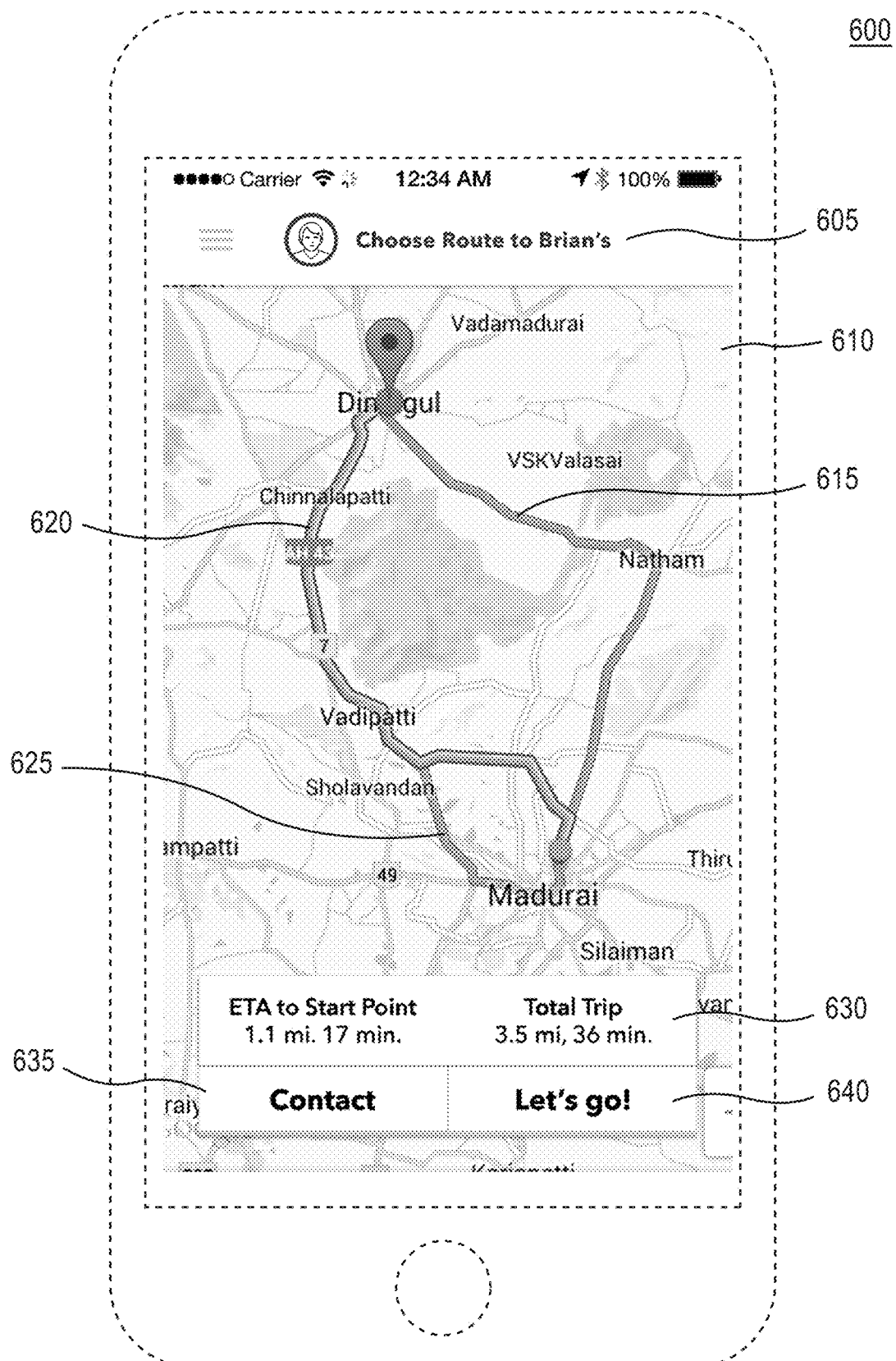
FIG. 6 illustrates a graphical user interface providing route information and directions to a third party rider pickup location.

FIG. 6 illustrates a graphical user interface 600 providing route information and directions to a third party rider pickup location. After the driver confirms the next pickup in the driver's schedule and whether or not a new pickup request is accepted or declined, the driver's device may provide the driver with one or more routes to the next pickup location, which are selectable by the driver. For example, graphical user interface 600 may include an indicator 605 instructing the driver to choose one of the provided routes as a preferred route to the next pickup location. A map 610 shown in graphical user interface 600 may include any number of routes. For the purpose of explanation, however, three routes are shown in graphical user interface 600: route 615, a second route 620, and a third route 625. As shown in FIG. 6, the driver selected second route 620 as the preferred route to travel to the next pickup location.

Graphical user interface 600 may further include an information box 630, which provides information about the selected second route 620. For example, information box 630 may include an estimated time to the pickup location, an estimated distance to the pickup location, the estimated total distance for the trip, and an estimated total duration for the trip. Graphical user interface 600 further provides interactive elements such as interactive element 635 and interactive element 640. Interactive element 635 may allow a driver to contact the third party rider or the user ride requestor by text message or telephone call. Interactive element 640 may allow a driver to accept the selected route and begin providing routing information to the driver's next pickup location.

Figure 7:
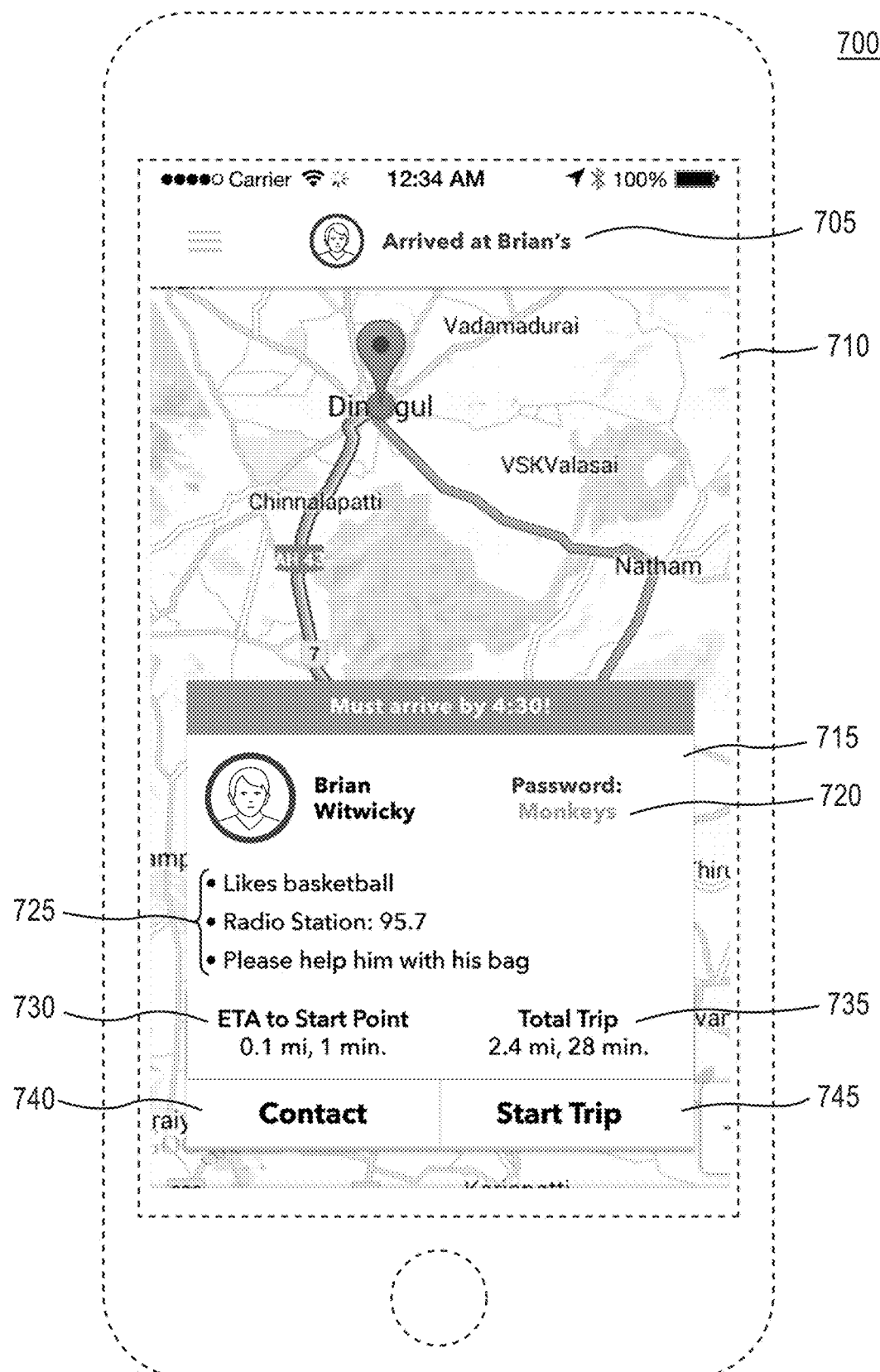
FIG. 7 illustrates a graphical user interface providing a driver with information about the third party rider.

FIG. 7 illustrates a graphical user interface 700, which provides a driver with information about the third party rider. When a driver arrives at the next pickup location, graphical user interface 700 may be updated with an indicator 705 indicating that the pickup location is reached. Graphical user interface may display a map 710 and an information box 715. Information box 715 may include a variety of information about the third party rider. Information box may include password information 720. Password information may be a password set by the user ride requestor and communicated to the driver via information box 715 and the third party rider. The third party rider may request the provided password from the driver to ensure the driver is indeed the driver the user ride requestor intended to dispatch to provide the third party rider a ride.

Information box 715 may further include a picture or virtual representation of the third party rider for whom the ride has been scheduled, and may include the name of the third party rider. Information box 715 may further include interest information 725, which provides the driver with information about the third party rider's interests to facilitate conversation between the driver and the third party rider. Interest information 725 may include medical information (allergies, medical conditions, medical equipment that should be with the third party rider, etc.) and/or instructions for the driver such as a request to help the third party rider with luggage or a particular bag. Interest information 725 may include other information about songs the third party rider may enjoy, radio stations preferred by the third party rider, audiobooks the third party rider might enjoy, and any other information that would serve to make the third party rider more comfortable during the ride.

Graphical user interface 730 may further include an information box 730 providing information concerning the amount of time required to travel to a start point for the ride, and a distance to the start point for the ride. Graphical user interface may further provide an information box 735 providing information concerning the amount of time required to complete a trip (based on the third party rider's destination), and a distance to the destination point of the third party rider's ride. Finally, graphical user interface may include interactive elements such as interactive element 740 and interactive element 745. Interactive element 740 may allow a driver to contact the third party rider or the user ride requestor by text message or telephone call. Interactive element 745 may allow a driver to indicate that the third party rider is picked up and the trip commences.

Figure 8:
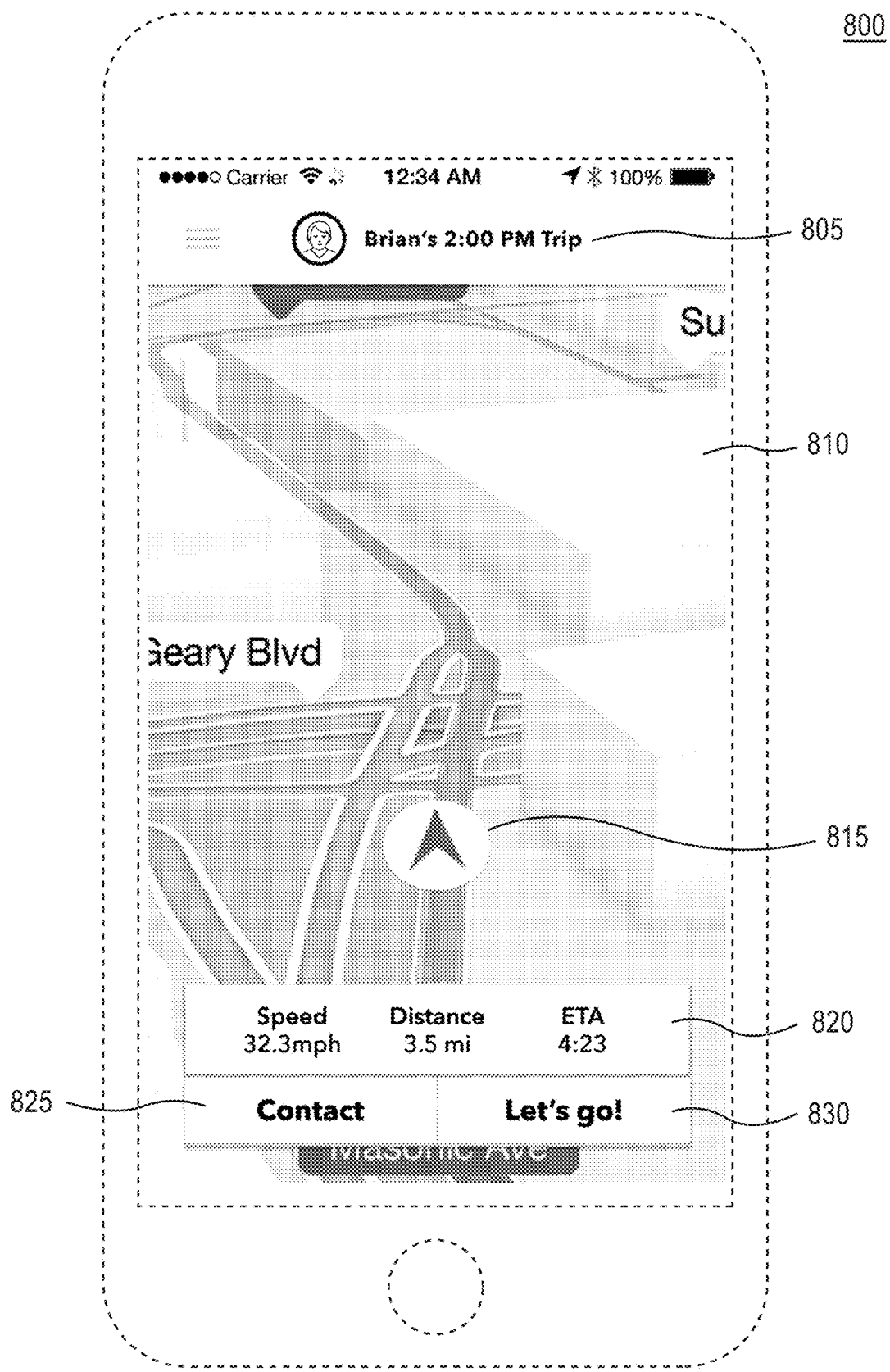
FIG. 8 illustrates a graphical user interface providing a real-time status report of the driver's vehicle progress.

FIG. 8 illustrates a graphical user interface 800 providing a real-time status report of the driver's vehicle progress. Graphical user interface 800 includes an indicator 805 that indicates the driver is currently providing a trip for a third party rider named "Brian." Indicator 805 may include a picture or visual representation of Brian. Graphical user interface 800 further includes a map 810 which also includes an indicator 815 representative of a current location of a driver's vehicle. Graphical user interface 800 may include an information box 820 which provides information about the speed of the vehicle, the distance to the destination, the distance traveled, and the estimated time of arrival at the destination location for the third party rider. Graphical user interface 800 further provides interactive elements such as interactive element 825 and interactive element 830. Interactive element 825 may allow a driver to contact the third party rider or the user ride requestor by text message or telephone call. Interactive element 830 may allow a driver to provide a further ride update.

Information shown in graphical user interface 800 may be transmitted in real time to other devices beginning with the driver's interaction with interactive element 745 shown in FIG. 7. Transmitted information may include, for example, a current location of the vehicle providing the ride for the third party rider, a speed of the vehicle, a distance the vehicle has traveled, a distance the vehicle has yet to travel, and an estimated time of arrival. Other devices may include a user device associated with the user ride requestor and one or more server computing devices computing device such that real time information about status of the ride and the third party rider may be practically instantaneously available to the user ride requestor, to the driver's supervisor or to the company employing the driver.

Figure 9:
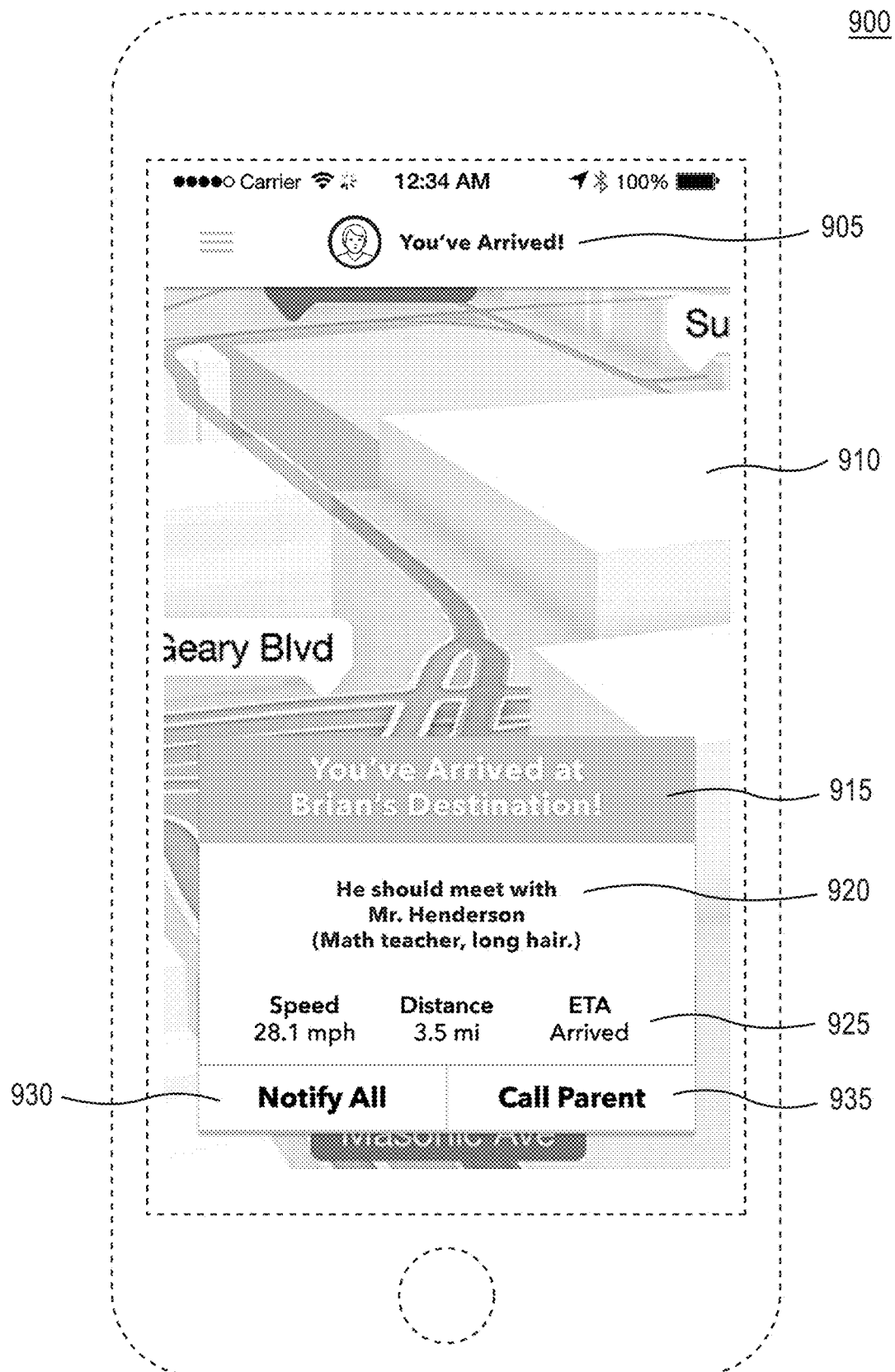
FIG. 9 illustrates a graphical user interface providing the driver with the ability to notify the ride requestor that the ride is completed.

FIG. 9 illustrates a graphical user interface 900, which provides the driver with the ability to notify the ride requestor the ride is complete. Graphical user interface 900 includes an indicator 905 indicating to the driver the vehicle arrived at the destination for the third party rider. Graphical user interface 900 may further include a map 910 on which is overlaid an information box 915, which provides additional dropoff information. Additional dropoff information may include information about a contact party to whom custody of the third party rider should be entrusted, a description of the contact party, an average speed of the ride, a distance covered by the ride, and a status indicator showing the destination is reached.

Graphical user interface 900 may provide the driver with an interactive element 930 which, when activated, transmits a real time notification to the ride requestor, the third party rider, and the one or more server computing devices computing device that the ride has been completed and the third party rider has safely been delivered to the custody of the contact party. In one embodiment, graphical user interface 900 may alert the driver when the driver is not within a certain distance from an identified pickup or dropoff location. For example, if the driver device determines that the vehicle is not within 100 meters of the identified pickup or dropoff location based on received GPS information, the driver device may prohibit the driver from indicating that the ride has been completed. Graphical user interface 900 may also contain an interactive element 935 which, when activated, allows the driver to call or send a text message to the ride requestor if additional information or concerns arise during the dropoff of the third party rider. Once the third party rider is safely delivered, the driver may proceed to the next ride request on the schedule shown in graphical user interface 300, shown in FIG. 3 and repeat the foregoing process for the next third party rider.

Finally, in some embodiments, graphical user interfaces 200-900 may include a picture or a virtual representation of a third party rider who is to be picked up by the driver such that the driver may positively identify the third party rider using the picture or the virtual representation of the third party rider. Identifying the third party rider by a visual likeness ensures that the correct third party rider is the third party rider who has been picked up by the driver. Further, in the event that the third party rider is a "no show" for the scheduled ride service, the driver device may transmit a notification to a ride scheduler or to the server indicating that the third party rider has not arrived at the pickup location at the scheduled time. Should the ride requestor cancel the ride for any reason, the driver may also be informed via a notification displayed on the driver device.

In further exemplary embodiments, a driver may, for example, input notes into the driver device for the driver's future reference. For example, the driver may take a picture of a particular pickup location and dropoff location for future reference. The driver may also take notes, recording information about the third party rider's hobbies, likes, dislikes, and other information that can improve third party rider experience in the future. These notes may also be transmitted from the driver device to the server device such that if other drivers provide similar rides for the third party rider in the future, these other drivers may access the recorded notes and enhance the experience for the third party rider.

The foregoing description has been presented for purposes of illustration. It is not exhaustive and does not limit the system to the precise forms or embodiments disclosed.

Modifications and adaptations are apparent to those skilled in the art from consideration of the specification and practice of the disclosed embodiments. For example, components described herein may be removed and other components added without departing from the scope or spirit of the embodiments disclosed herein or the appended claims.

Other embodiments are apparent to those skilled in the art from consideration of the specification and practice of the disclosure disclosed herein. It is intended the specification and examples are considered as exemplary only, with a true scope and spirit of the invention being indicated by the following claims.

What is claimed is:

1. A method of providing a ride service for a third party rider in response to a ride request from a user ride requestor, comprising:
   receiving, by a driver device, identification information of the third party rider;
   receiving, by the driver device, pickup information comprising:
      an address for pickup of the third party rider;
   receiving, by the driver device, interest information from the ride requestor about the third party rider;
   transmitting, by the driver device, real time ride status information to the user ride requestor,
   receiving, by the driver device, dropoff information, and
   transmitting, by the driver device, information upon arrival at a destination to the user ride requestor.

2. The method of claim 1, wherein the identification information includes a visual image of the third party rider.

3. The method of claim 1, wherein the identification information includes a password.

4. The method of claim 1, wherein the real time ride status information includes a speed of a vehicle being used by the driver.

5. The method of claim 1, wherein the real time ride status information includes a distance from a destination.

6. The method of claim 1, wherein the real time ride status information includes an estimated time of arrival at a destination.

7. The method of claim 1, wherein the real time ride status information includes a current location of a vehicle being used by the driver.

8. The method of claim 1, wherein the real time ride status information is transmitted through a cellular network.

9. The method of claim 8, wherein the real time ride status information is transmitted to the ride requestor.

10. The method of claim 1 wherein the real time ride status information is transmitted by text message.

11. The method of claim 10 wherein the real time ride status information is transmitted to the ride requestor.

12. The method of claim 1, wherein transmitting of information includes notifying another device of arrival of the third party rider at a destination.

13. The method of claim 12, wherein the device notified is a device associated with the ride requestor.

14. The method of claim 1, wherein transmitting dropoff information includes information about a trusted contact party at a dropoff location.

15. The method of claim 14, wherein the dropoff information includes a physical description of the contact party at a dropoff location.

16. The method of claim 1, wherein the dropoff information includes contact information of the ride requestor.

17. The method of claim 1, wherein the dropoff information includes an estimated duration of a ride.

18. The method of claim 1, wherein the dropoff information includes an average speed of the ride.

19. The method of claim 1, wherein the dropoff information transmitted includes dropoff conditions.

20. The method of claim 1, wherein the dropoff information transmitted includes dropoff instructions.

* * * * *